July 31, 1923.
J. PEDERSEN
WINDSHIELD CLEANER
Filed Dec. 9, 1921
1,463,590
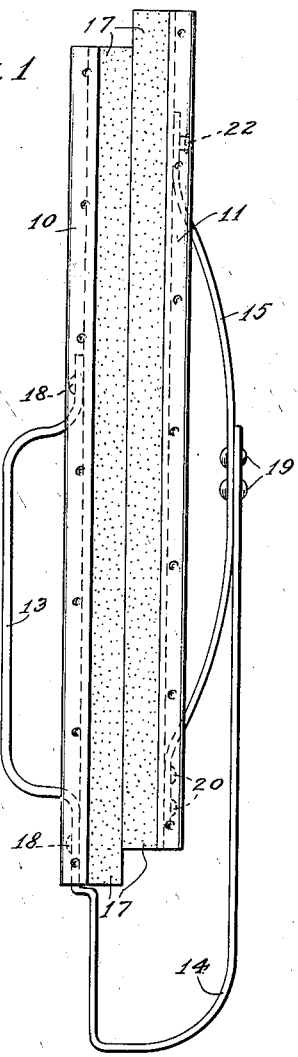
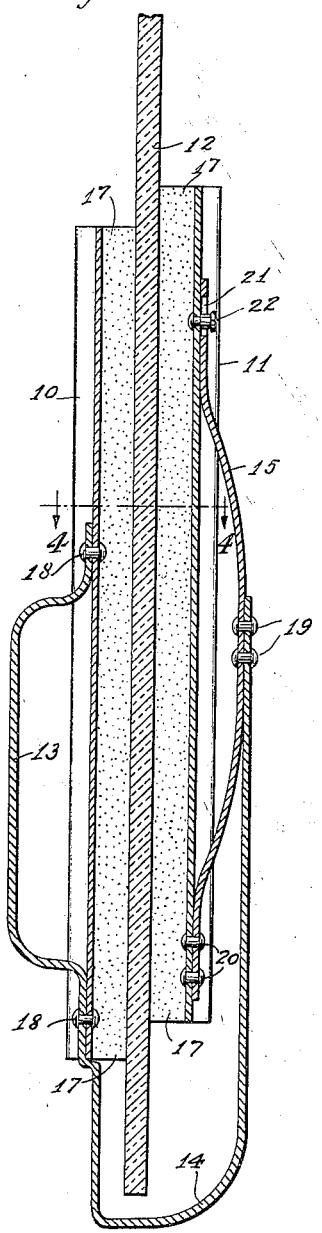
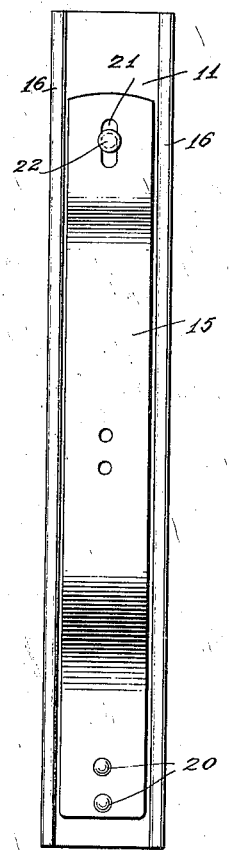
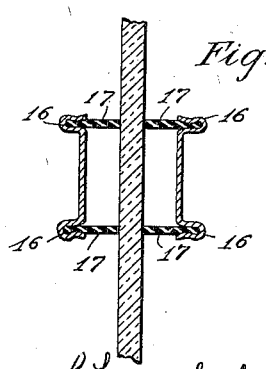
INVENTOR.
Julius Pedersen
BY
Chamberlain & Newman ATTORNEYS.

Patented July 31, 1923.

1,463,590

UNITED STATES PATENT OFFICE.

JULIUS PEDERSEN, OF BRIDGEPORT, CONNECTICUT.

WINDSHIELD CLEANER.

Application filed December 9, 1921. Serial No. 521,119.

*To all whom it may concern:*

Be it known that JULIUS PEDERSEN, a citizen of the United States, and resident of Bridgeport, in the county of Fairfield and State of Connecticut, has invented certain new and useful Improvements in Windshield Cleaners, of which the following is a specification.

My invention relates to wind shield cleaners, such as are designed for removable attachment to automobile wind shields, in a way to engage the opposite sides of the glass, and adapted to be moved longitudinally by hand along the opposite faces of the wind shield in a manner to clear the same of water, snow, dust or other objectionable matter.

To provide a wind shield cleaner of the above class which will be simple in construction, inexpensive to manufacture and particularly efficient in its operation. Further to include means whereby the two cleaning members of the device will be spring pressed against the glass wind shield in a way to insure the opposite end portions of the wiper members being provided with a substantially even spring tension so as to provide uniform engagement with the glass.

With the above and other objects in view the invention comprises the construction, arrangement and combination of parts as now to be fully described and as hereinafter to be specifically claimed, it being understood that the disclosure herein is merely illustrative and meant in no way to limit the spirit of the invention, slight changes in the details of construction and arrangement of parts being permissible so long as within the scope of the appending claims.

In the accompanying drawings forming a part of this specification,

Fig. 1 shows a side elevation of my novel form of wind shield cleaner;

Fig. 2 is a central vertical section of the same, shown applied to a glass wind shield;

Fig. 3 is a front elevation of the outer or front wiper member, of my wind shield cleaner, as shown in Figs. 1 and 2, and;

Fig. 4 shows a cross section through the two wind shield members and glass as shown on line 4—4 in Fig. 1.

The invention as will be seen, briefly speaking, includes two somewhat similar wiper members 10 and 11, one of which is arranged to operate upon the inner face of a glass wind shield 12 and the other on the opposite face and directly opposite the front member. To one of the said members is secured a handle 13 for operating the cleaner. The two said members are connected by means of a loop shaped holder 14 formed integral with the said handle and whose outer end portion is in turn provided with a spring 15 secured to the front wiper member 11.

The two wiper members are very similar in construction and each includes longitudinal pockets 16 in which one edge portion of rubber strips 17 is secured for supporting the same in place relative to each other and for properly engaging the face of the glass when dawn there-across. The handle 13 and holder 14 are shown secured to the inner wiper member by means of rivets 18 while the outer member is supported from the end portion of the holder 14 through the above mentioned spring 15.

This spring is preferably bow-shaped, the intermediate portion being secured to the end portion of the frame by means of rivets 19 whereas one end of the spring is rigidly secured to the back of the inner wiper member by similar rivets 20, one end of the spring is preferably provided with a slot 21 to permit one end portion of the spring to operatively engage the back of the wiper and against which said spring is held by means of the headed guide pin 22 secured to the upper end portion of the back of said front wiper member. By this means it will be seen that the outer wiper member is supported by the ends of the spring engaging the end portions of the said wiper member, and that the said bow spring in turn is supported at its intermediate portion by the end portion of the holder. This construction obviously insures a uniform yieldable pressure upon the two end portions of the outer wiper member thus insuring a uniform engagement upon the face of the glass, and in a way to properly accommodate different thicknesses of glass wind shields and to insure a proper cleaning operation upon them, irrespective of thickness.

It will be further noted that the end of the holder to which the spring is fastened is sufficiently spaced from the back of the wiper to allow room for the required yieldable action of the spring necessary to insure the effective application and operation of the cleaner to wind shields of different thicknesses as before referred to.

Having thus described my invention, what I claim and desire to secure by Letters Patent is:—

1. A wind shield cleaner comprising a pair of elongated wiper members adapted to be positioned on opposite faces of a glass wind shield, a substantially U-shaped holder for supporting and connecting said wiper members, one end of said holder being rigidly connected to one of said wiper members, and the other end extending in spaced relation to the other wiper member, and a bow spring rigidly connected to said spaced end and having its end portions connected at spaced points to said other wiper member to yieldably support the one with relation to the other and to maintain them in aligned relation.

2. A wind shield cleaner comprising a pair of elongated wiper members adapted to be positioned on opposite faces of a glass wind shield, a substantially U-shaped holder for said wiper members, one portion of which includes a handle and is secured to one of the wiper members and having another portion disposed in alignment with and in spaced relation to the other wiper member, and a bow spring rigidly connected to said spaced portion and having its end portions connected at spaced points to said other wiper member to yieldably support the same, and to maintain it in aligned relation to said holder the connection of said spring at one end being slidable.

3. A wind shield cleaner comprising a pair of elongated wiper members adapted to be positioned on opposite faces of a glass wind shield, a holder for said wiper members one portion of which includes a handle secured to one of the wiper members and another portion disposed forward of the other wiper member, a sheet metal spring the intermediate portion of which is secured to the end of said holder and having its end portions respectively rigidly and slidably connected to said wiper member in a manner to yieldably and evenly support the same.

Signed at Bridgeport, in the county of Fairfield and State of Connecticut, this 6th day of December, A. D. 1921.

JULIUS PEDERSEN.

Witnesses:
C. M. NEWMAN,
LILLIAN M. ALLING.